United States Patent
Vos et al.

(10) Patent No.: US 10,795,773 B2
(45) Date of Patent: Oct. 6, 2020

(54) PERSISTENT VIDEO CAMERA AND METHOD OF OPERATION

(71) Applicant: EAGLE EYE NETWORKS, INC., Austin, TX (US)

(72) Inventors: Tijmen Vos, Amsterdam (NL); Zeynep Yurdakul, Amsterdam (NL); Bernard Maassen, Amsterdam (NL); Wouter Lauret, Amsterdam (NL); Alexander Sebastiaan Borsboom, Amsterdam (NL)

(73) Assignee: EAGLE EYE NETWORKS, INC, Austin, TX (US)

( * ) Notice: Subject to any disclaimer, the term of this patent is extended or adjusted under 35 U.S.C. 154(b) by 81 days.

(21) Appl. No.: 16/214,246

(22) Filed: Dec. 10, 2018

(65) Prior Publication Data

US 2020/0151061 A1    May 14, 2020

Related U.S. Application Data

(63) Continuation-in-part of application No. 16/186,659, filed on Nov. 12, 2018.

(51) Int. Cl.
*H04N 7/18* (2006.01)
*G08B 13/196* (2006.01)
*H04N 5/232* (2006.01)
*G06F 11/14* (2006.01)

(52) U.S. Cl.
CPC ...... *G06F 11/1441* (2013.01); *G06F 11/1443* (2013.01); *H04N 5/232411* (2018.08); *H04N 7/186* (2013.01)

(58) Field of Classification Search
None
See application file for complete search history.

(56) References Cited

U.S. PATENT DOCUMENTS

| | | | |
|---|---|---|---|
| 6,549,674 B1* | 4/2003 | Chui | G06F 3/0481 375/E7.043 |
| 6,697,104 B1* | 2/2004 | Yakobi | G06K 9/00778 348/143 |
| 6,873,343 B2* | 3/2005 | Chui | H04N 1/3875 345/589 |
| 7,612,796 B2* | 11/2009 | Lev-Ran | G06K 9/00369 348/143 |
| 9,076,028 B2* | 7/2015 | Summers | H04N 7/15 |
| 9,349,054 B1* | 5/2016 | Saitwal | G06T 7/136 |
| 10,507,381 B2* | 12/2019 | Katoh | G01B 11/00 |
| 10,609,276 B2* | 3/2020 | Lee | H04N 5/907 |

* cited by examiner

*Primary Examiner* — John F Mortell
(74) *Attorney, Agent, or Firm* — Patentry; Peter G. H. Hwang

(57) ABSTRACT

A camera reboots when a first timer expires but defers when a connection enables a server to reset the first timer. The system uses a visitor filtration apparatus to encode and store time-windows for expected visitors and generate optical credentials as visitor indicia and policies to greet, transform messages, and determine various access to visitors, both expected or unexpected. A video doorbell component of the system triggers on image or audio capture, transforms and verifies optically encoded credentials and actuates a physical access control actuator, triggers a visitor filtration apparatus, or relays images and audio with an interview panel. The optical credential is transmitted electronically to an expected visitor and may be printed or displayed from an electronic media.

1 Claim, 7 Drawing Sheets

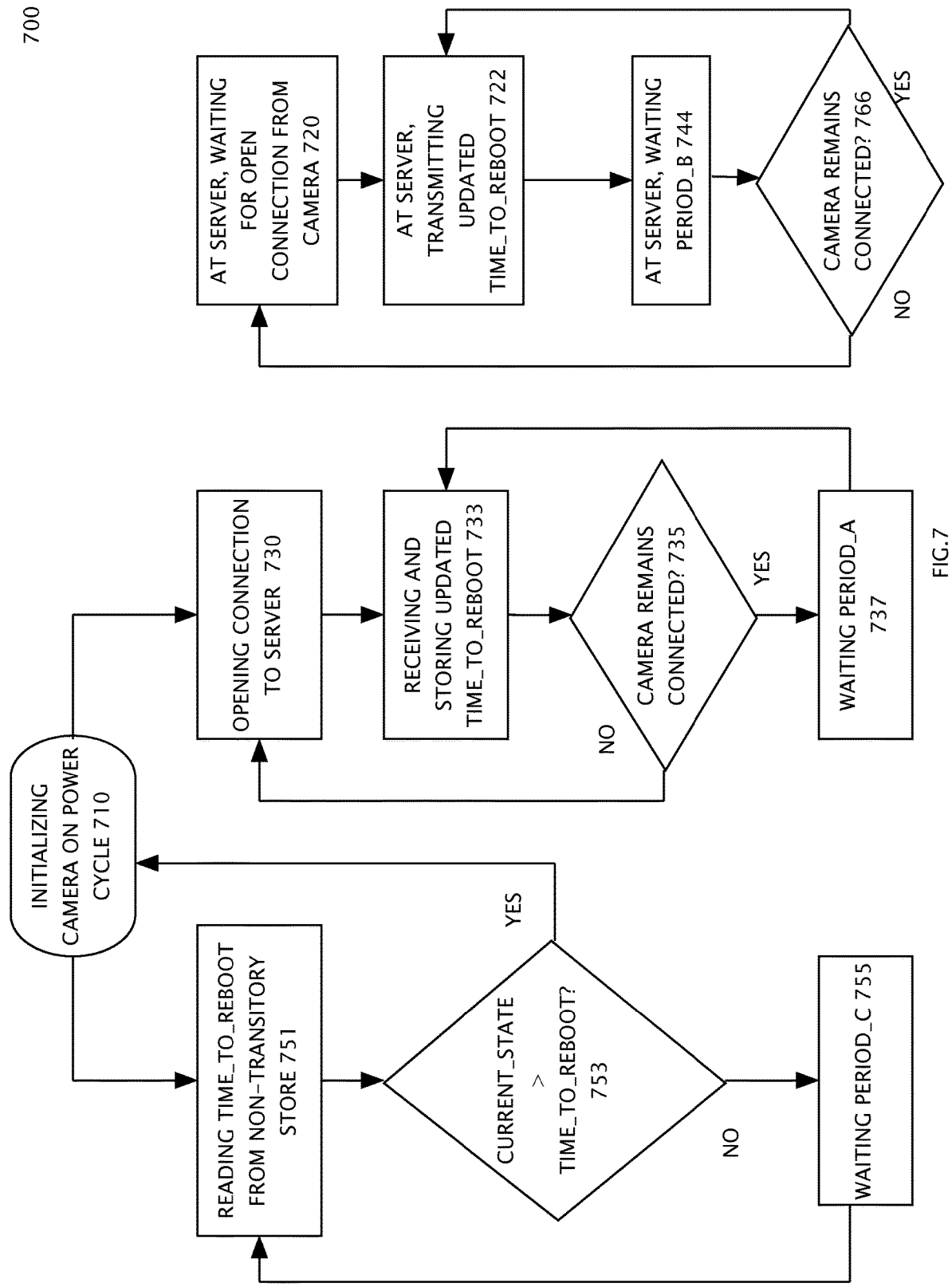

PERSISTENT VIDEO CAMERA AND METHOD OF OPERATION

CROSS-REFERENCE TO RELATED APPLICATIONS

The present application is a Continuation-in-part application of Ser. No. 16/186,659 Secure Video Doorbell Visitor Filtration System and Method of Operation filed Nov. 12, 2018, benefits from its priority, and incorporates it by reference in its entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Technical Field

The disclosure relates to video security systems and physical access control.

Background

As is known, conventional IP cameras inexplicitly go offline occasionally. Sometimes they recover without intervention, but it is known that a reboot may be required to remediate the problem. Some conventional IP cameras require a fixed interval reboot cycle built-in such as once a week even though it creates an unnecessary gap in recording when a reboot was unnecessary. Another conventional solution is to connect such a camera to a Power over Ethernet switch which can be remotely controlled to power cycle the camera but which requires additional cost and complexity. What is needed is a way to resolve these outages only when needed and without additional cost.

As is known wireless security cameras are combined with bidirectional voice telephony. As is known, voicemail, Short Messaging Service, and email enable time-shifting electronic messaging.

What is needed is a solution for the problem of unnecessary gaps in the recording due to rebooting the cameras.

SUMMARY OF INVENTION

A camera self-resolves faults by rebooting when communication has lapsed. But recoverable intermittent failures enable delaying reboot upon reestablishing communication to a server which resets a failing state. A video camera is configured to connect to a server and to reboot itself when the connection has been unrecoverable over a period of time. A server is configured to receive access to the camera and to delay the reboot process. The rebooting process is indefinitely delayed unless the camera has a fault that prevents the reestablishment of the connection process more than a selectable number of times or a length of time.

A video doorbell apparatus and electronic access control system operates by determining a date-time when a video doorbell is actuated by a recognizable extemporaneous caller; a scheduled visitor/services provider; or an unknown solicitor/stranger. In the latter case, providing an outgoing message, and from a date-time policy at least one of the following, recording a message for delayed playback, connecting the interview panel to the video doorbell immediately, relaying the recorded message on schedule or request from the interview panel, and transmitting a notification, wherein an unknown solicitor/stranger is any party which neither a recognizable extemporaneous caller nor a scheduled visitor/services provider.

This includes receiving a credential presented to the video doorbell; verifying the credential is valid for the location of the video doorbell and the date-time is within a valid range; transmitting a notification; and playing an outgoing message/instruction. The method for determining a data-time when a video doorbell is actuated by a scheduled visitor/services provider includes: generating a credential for a visitor/services provider to access a portal; determining a range of date-time for validity of the credential; distributing the credential to a communication device of the visitor/service provider; transforming the credential and the range of valid date-time into a first encrypted code; distributing the first encrypted code to the portal.

A method at the video doorbell, includes receiving the first encrypted code; receiving the credential from the communication device of the visitor/service provider at a date-time, transforming the date-time of reception and the credential into a second encrypted code, and matching the first encrypted code with the second encrypted code.

The method for responding to a category of recognizable extemporaneous caller includes selecting among a store of policies for each category and date-time, presenting an outgoing message or greeting, communicatively coupling the video doorbell to one of an interview panel and a message store according to the selected policy, and responding to access control instructions at the interview panel.

A method for determining that a video doorbell is actuated by a Recognizable extemporaneous caller includes: determining a match with biometric indicia in a store of friends/family/neighbors; determining a match with image indicia of uniforms and badges of identification; and determining a match with stored shipping waybills and product barcodes.

A system enables a visitor filtration apparatus to encode and store time-windows for expected visitors and generate time limited optical credentials as visitor indicia and policies to greet, transform messages from, and determine various access to visitors both expected or unexpected.

The system includes at least a video doorbell (videoorbell) having electronic and audio communication circuits, a camera, and a processor. The system couples to an interview panel by which a visitee stores outgoing messages, date-time windows, access policies, and visitor indicia and attends to incoming messages in delayed or real time.

A secure optically encoded credential such as a QR or a bar code is transmitted to an expected visitor with its date-time validity. A transformed secure optically encoded credential is stored in a visitor filtration apparatus or in a videoorbell.

Various policies provide for physical access control or electronic access by direct coupling or stored messages. Policies operate on date-time of the visit, and visitor indicia which includes faces, voices, badges, uniforms, package delivery waybills, and combinations thereof.

A video doorbell component of the system triggers on image or audio capture, transforms and verifies optically encoded credentials and actuates a physical access control actuator, a visitor filtration apparatus, or relays images and audio with an interview panel. The optical credential, e.g. QR code or bar code, is transmitted electronically to an expected visitor and may be printed or displayed from an electronic media. Policies enable recognition of biometrically enhanced images of faces or faces with uniform hats such as emergency services agents. Messages are stored for replay or transmitted immediately.

The system may actuate a physical access control apparatus or couple the video doorbell directly to an interview panel of the visitee or of an intermediary, or present greetings or instructions and take audio-visual messages. Voice to text circuits may override stored policies for emergency keywords, e.g. "Fire."

In an embodiment, the system includes a visitor filtration apparatus performing instructions to store outgoing and incoming messages, secure optically encoded credentials, date-time policies and visitor indicia for individuals or for classes such as police, fire, postal employees, delivery agents, utility workers, and complete strangers (none of the above).

BRIEF DESCRIPTION OF DRAWINGS

The foregoing and other objects, aspects, features, and advantages of the disclosure will become more apparent and better understood by referring to the following description taken in conjunction with the accompanying drawings, in which:

FIG. 7 is a flow chart of a method embodiment of a persistent camera component.

DETAILED DESCRIPTION OF INVENTION

Figure 1:
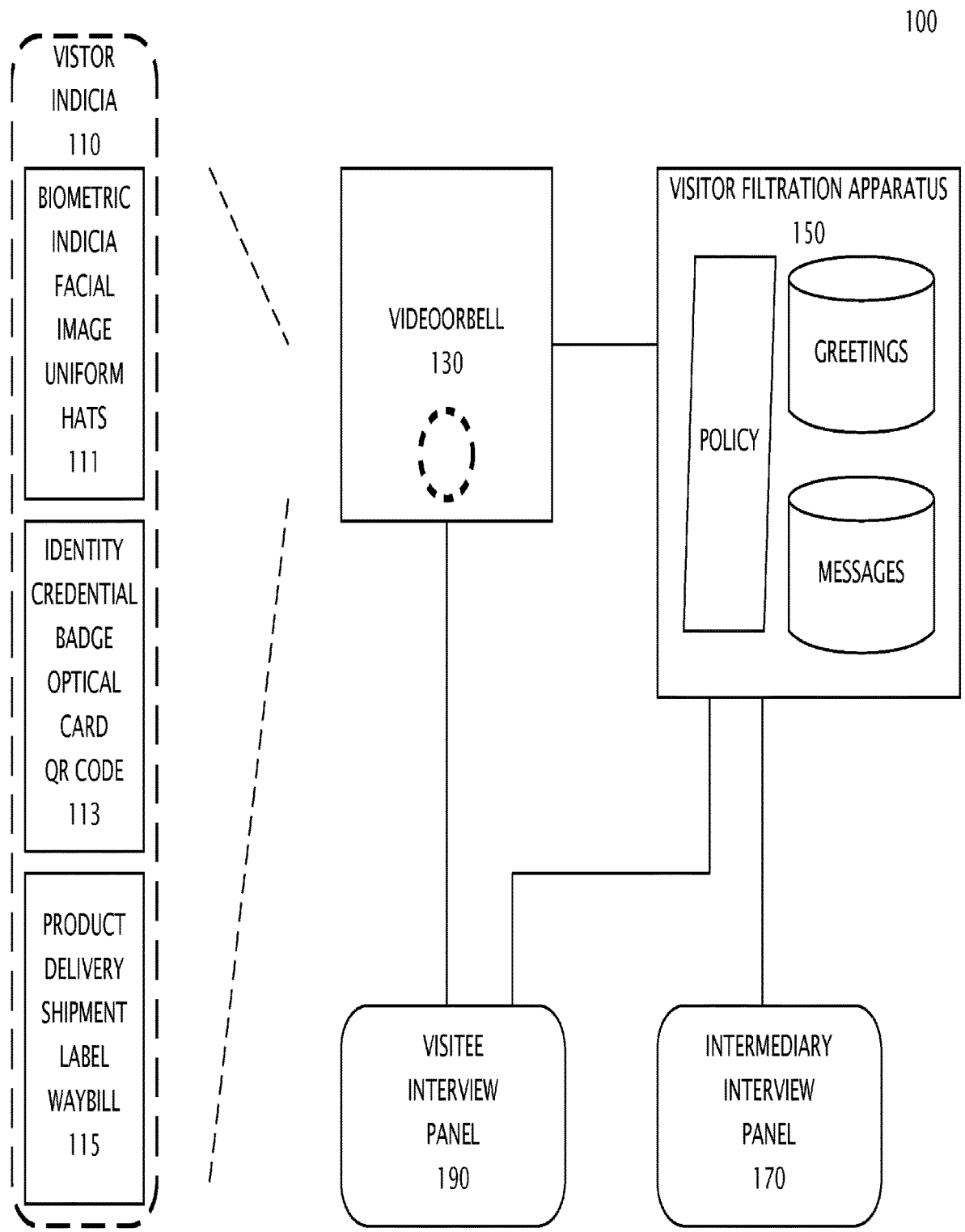
FIG. 1 is a block diagram of a system having a video doorbell, coupled to at least one interview panel, and in an embodiment, coupled to a visitor filtration apparatus.

Another aspect of the invention is a method to recover from intermittent failures without producing unnecessary gaps in the surveillance record. A camera is configured with a process to communicate with a server which regularly resets a rebooting process. The rebooting process completes when communication is interrupted beyond a limit. A plurality of processes performed by processors executing in parallel includes at a server, waiting for a camera to open a connection; when the camera is connected, transmitting updated TIME_TO_REBOOT to camera; waiting PERIOD_B; determining whether camera remains connected; when camera has lost connection, wait for reconnection and send another TIME_TO_REBOOT; when camera remains connected, repeat waiting; wherein in embodiments, TIME_TO_REBOOT may be expressed as absolute Date-time, incremental date-time, day of week and time of day, units of time, calendar, number of connection failures; at a camera, initializing a plurality of parallel processes upon power cycle; a first parallel process includes: opening a connection to a server; receiving and storing an updated TIME_TO_REBOOT from the server; determining whether camera remains connected; when camera has lost connection, attempt reconnection and getting updated TIME_TO_REBOOT; when camera remains connected, waiting PERIOD_A; and then checking for connection; and a second parallel process comprising: reading TIME_TO_REBOOT from non-transitory store; determining whether TIME_TO_REBOOT has been exceeded by CURRENT_STATE; when CURRENT_STATE exceeds TIME_TO_REBOOT, rebooting the processes; when CURRENT_STATE does not exceed TIME_TO_REBOOT, waiting PERIOD_C; and returning to checking for excessive non-communication.

One use of a camera is in a video doorbell which has three general modes of operation. It may generally present greetings to a visitor and receive messages to be stored and forwarded to the visitee. Under certain combinations of date-time and visitor indicia, it may directly couple to an interview panel of the visitee or his intermediary agent or representative. When expected visitors present an optically encoded credential such as bar codes or QR codes, other policies are triggered for physical access or electronic access. The policies may be overridden by combinations of visitor indicia and key words converted from speech. Non-limiting examples of visitor indicia include but are not limited to voice biometrics, and facial biometrics of family, uniform hats of sworn emergency service personnel, package and shipping waybills of delivery services. Stored greetings may include further instructions according to the visitor indicia presented.

A method embodiment of the invention is for operation of a video doorbell apparatus and electronic access control system by: determining a date-time when a video doorbell is actuated by a recognizable extemporaneous caller; determining a date-time when a video doorbell is actuated by a scheduled visitor/services provider; or, determining a date-time when a video doorbell is actuated by an unknown solicitor/stranger, defaulting upon the latter condition to, providing an outgoing message, and from a date-time policy exemplary further steps including but not limited to, recording a message for delayed playback, connecting the interview panel to the video doorbell immediately, relaying the recorded message on schedule or request from the interview panel, and transmitting a notification perhaps to a security service, a relative, a neighbor, or a caregiver. Under certain conditions and policies, the further method includes receiving a credential presented to the video doorbell; verifying the credential is valid for the location of the video doorbell and the date-time is within a valid range; transmitting a notification; and playing an outgoing message/instruction.

An exemplary non-limiting process for determining when a video doorbell is actuated by a scheduled visitor/services provider includes generating a credential for a visitor/services provider to access a portal; determining a range of date-time for validity of the credential; distributing the credential to a communication device of the visitor/service provider; transforming the credential and the range of valid date-time into a first encrypted code; and distributing the first encrypted code to the portal.

At the video doorbell, one exemplary method includes receiving the first encrypted code; receiving the credential from the communication device of the visitor/service provider at a date-time, transforming the date-time of reception and the credential into a second encrypted code, and matching the first encrypted code with the second encrypted code.

Other method steps include, under certain conditions such as date-time, stored instructions, verification of the visitor, recording an image from the video doorbell and actuating a physical access control apparatus such as opening a door, lift, delivery chute, or gate.

The method of operation also includes: receiving an image from the video doorbell; determining a category of recognizable extemporaneous caller, selecting among a store of policies for each category and date-time, presenting an outgoing message or greeting, communicatively coupling the video doorbell to one of an interview panel and a message store according to the selected policy, and responding to access control instructions at the interview panel.

The method for determining when a video doorbell is actuated by a recognizable extemporaneous caller includes: determining a match with biometric indicia in a store of friends/family/neighbors; determining a match with image indicia of uniforms and badges of identification; and determining a match with stored shipping waybills and product barcodes.

In an embodiment, the process further includes: selecting among a store of ringtones based on the identity of a category or individual in the store; communicatively coupling the video doorbell to the interview panel of a legal representative; and actuating a physical access control portal according to the instruction at the interview panel.

In an embodiment, the video doorbell hashes the optically encoded credential with one or more most significant bits of date-time and attempts to match the resulting hash with a stored transformation of the optically encoded credential sent to the visitor. Upon success or failure of matching, doors may be opened or not, messages can be presented to the visitor, direct communication with a selected interview panel can be coupled, or a message may be recorded for immediate or delayed delivery to the visitee.

Referring now to the exemplary figures and other non-limiting embodiments provided for clarification of aspects of the invention without constraining the breadth of the inventive concepts:

FIG. 1 is a block diagram of a system having a video doorbell (videoorbell) 130, coupled to a visitor filtration apparatus 150. Both the videoobell and the visitor filtration apparatus enable filtered communication with a selected visitee interview panel 190 or to an intermediary interview panel 170 based on date-time, policies, and visitor indicia.

Exemplary visitors 110 actuate the videoorbell 130 by triggering an audio or video sensor and presenting an optically encoded credential or biometric such as a face, voice, or a government agency credential such as an official warrant card or badge, or a package code, or a service provider identification. A hash or other transformation of date-time and an optically encoded credential is compared with a stored transformation of an optically encoded credential for an expected visitor to trigger a policy for physical access or electronic access. When no matching transformation is found, for example an unexpected visitor, visitor indicia is relayed to a visitor filtration apparatus 150. The visitor filtration apparatus 150 may present directions or greetings, store and forward messages, and apply policies based on stored identities and date-time of visit to connect in timeshifted or real-time to an intermediary interview panel 170 or to a visitee interview panel 190. Expected or high priority visitor indicia may be downloaded to the videoorbell for immediate and direct connection to a selected panel.

Figure 2:
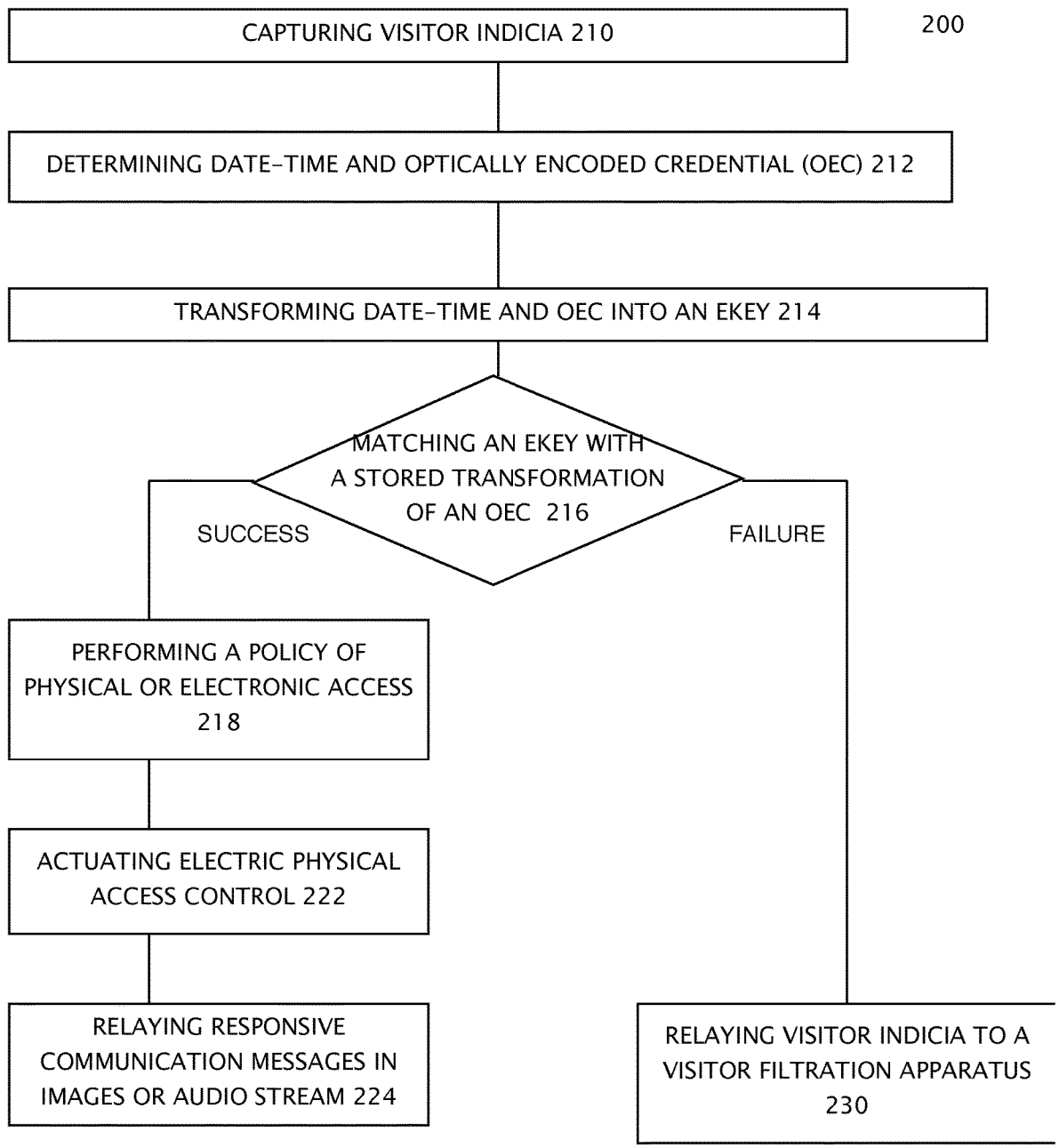
FIG. 2 is a flowchart of a method of operation for a video doorbell.

FIG. 2 is a flowchart of a first method 200 of operation for a videoorbell, upon activation, capturing visitor indicia 210 including at least one of an audio stream of a visitor, a still image of a visitor, a video stream of a visitor, and a credential encoded in computer-readable optical imagery; determining date-time and optically encoded credential 212; transforming said date-time and optically encoded credential into ekey 214; matching said ekey with a stored transformation of an optically encoded credential 216; performing upon successful matching, a policy of physical or electronic access enablement 218; and upon failed matching, relaying said visitor indicia to a visitor filtering apparatus 230; wherein said policy of access enablement includes but is not limited to actuating electric physical access controls 222 and relaying (receiving, transmitting, transforming, and presenting) responsive communication messages in images or audio stream 224.

Figure 3:
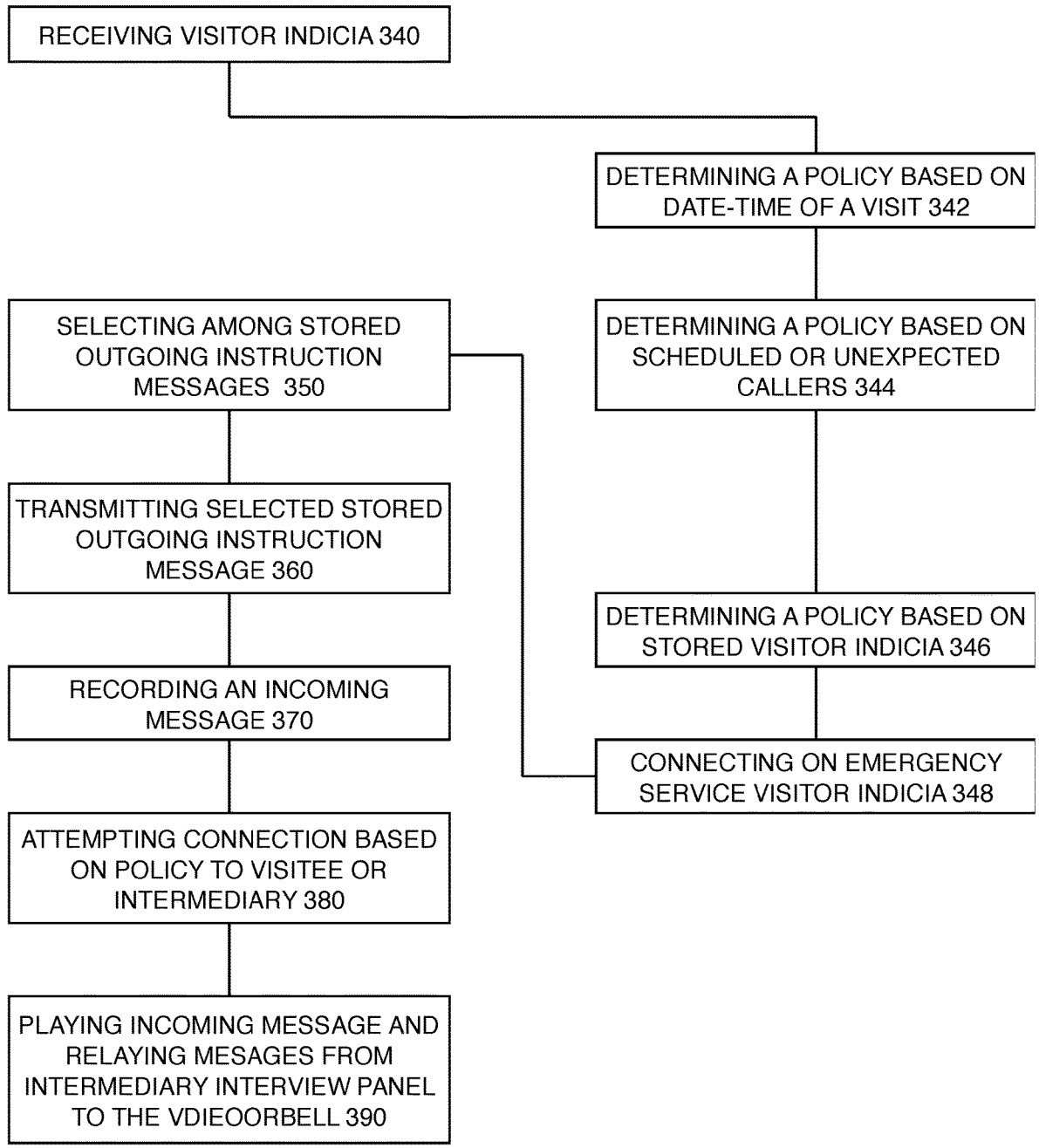
FIG. 3 is a flowchart of various non-limiting embodiments of methods for operation of a visitor filtration apparatus communicatively coupled to a video doorbell and to an interview panel

FIG. 3 is a flowchart 300 of various non-limiting embodiments of methods for operation of a visitor filtration apparatus communicatively coupled to a video doorbell and to an interview panel, receiving visitor indicia 340, determining a policy based on date-time of a visit 342, determining a policy based on scheduled or unexpected callers 344, determining a policy based on stored visitor indicia such as faces, badges, packages, service provider identity documentation 346; connecting immediately on the condition of emergency service visitor indicia 348; selecting among a plurality of stored outgoing instruction messages 350, transmitting the selected stored outgoing instruction message 360, recording an incoming message 370, and attempting connection based on date-time policy to one of a visitee interview panel and an intermediary interview panel such as a legal service provider 380; and upon successful connection playing the incoming message and relaying responsive communication messages from the intermediary interview panel to the videoorbell 390.

Figure 4:
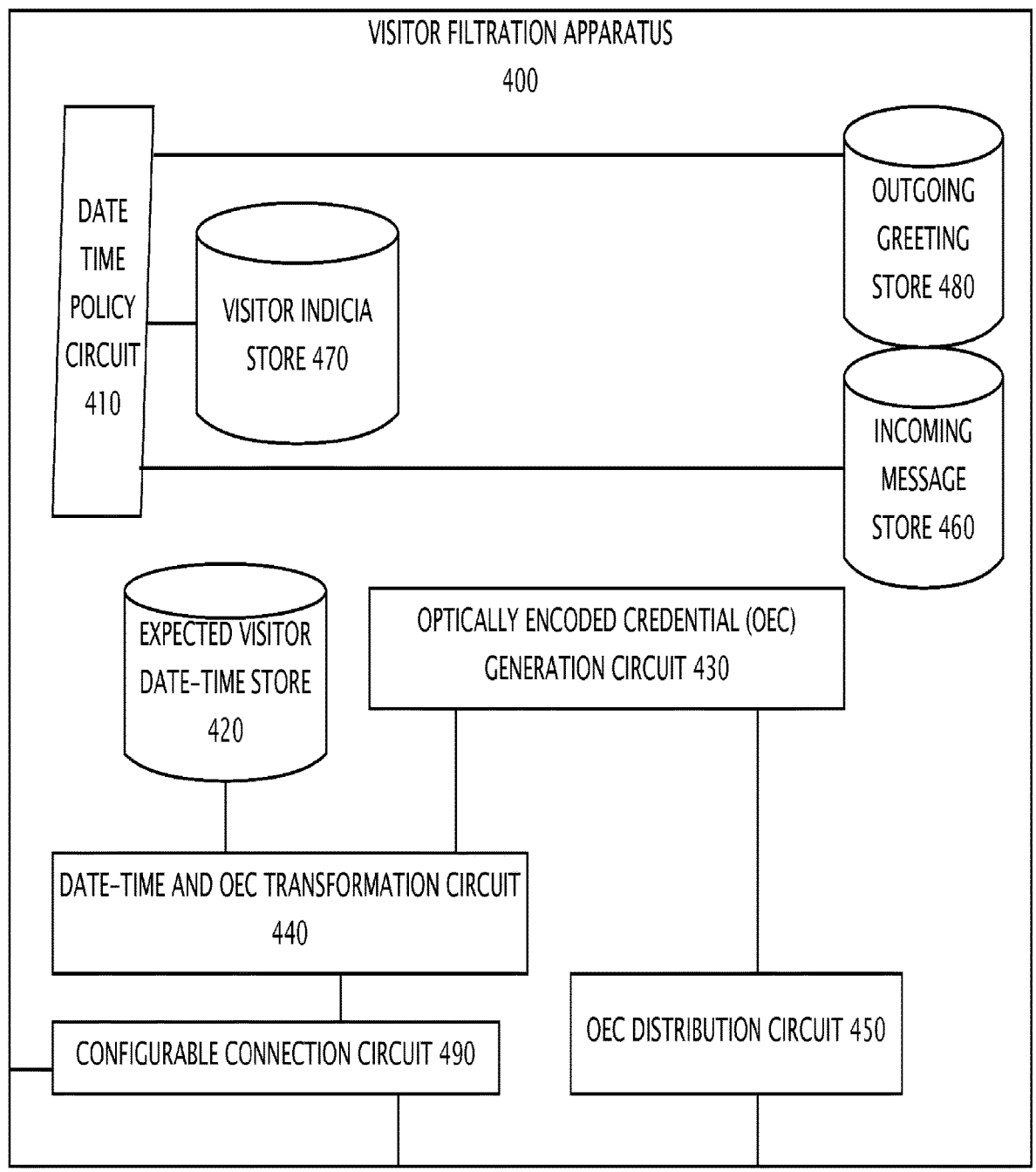
FIG. 4 is a block diagram of a first visitor filtration apparatus component of the invention.

FIG. 4 is a block diagram of a first apparatus embodiment of a visitor filtration apparatus 400 the apparatus comprising: a date-time policy circuit 410; an expected visitor date-time appointment range store 420; an optically encoded credential generation circuit 430; a date-time and optically encoded credential transformation circuit 440; an optically encoded credential distribution circuit 450; an incoming message store 460; a visitor indicia store 470; an outgoing greeting store 480; and a configurable connection circuit 490 which determines if and when a visitor or message is communicatively coupled to a selected visitee interview panel or intermediary interview panel. Non-limiting examples of an optically encoded credential distribution circuit include a radio, a cellular baseband processor, a Simple Mail Transfer Protocol email server, a Short Message Service client, and a Portable Document Format image fax server.

Figure 5:
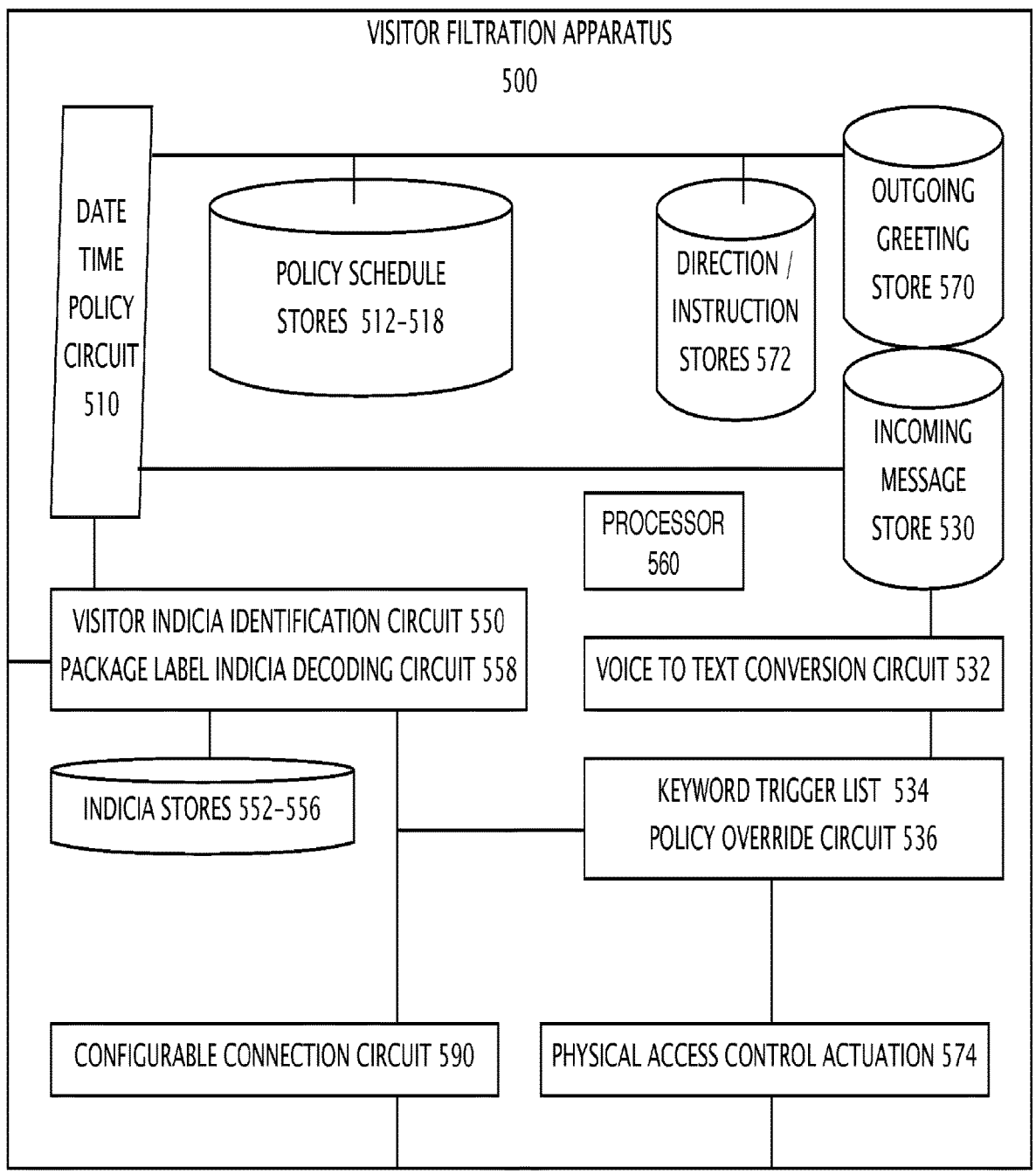
FIG. 5 is a block diagram of embodiments of a visitor filtration apparatus.

FIG. 5 is a block diagram of embodiments of a visitor filtration apparatus 500 which includes circuits distributable among displays, videoorbells, custom or programmable chips, and processors performing instructions encoded and readable from non-transient media, embodiments of the apparatus comprising at least one of: a date-time policy circuit 510; a policy store of when visitors of certain types may be connected 512; a policy store of which outgoing greetings are played by visitor indicia 514; a policy store of when incoming messages are relayed to the visitee interview panel 516; a schedule store of when certain visitors are expected 518; an incoming message store 530; a voice to text conversion circuit 532; a keyword trigger list 534; a policy override trigger responsive to keywords 536; a visitor indicia identification circuit 550; a government agency identity indicia store 552; a service identity indicia store 554; a personal visitor biometric indicia store 556; a package label indicia decoding circuit 558; an outgoing greeting store 570; a selectable direction or instruction message store 572; a physical access control actuation circuit 574; and a configurable connection circuit 590 which determines if and when a visitor or message is communicatively coupled to a selected visitee interview panel or to an intermediary interview panel; said circuits and stores mutually coupled communicatively with a processor 560. Non-limiting examples of an intermediary include a trustee, a parent, a conservator, an adult child, a legal services provider, an attorney, and an executive assistant. In exemplary embodiments, a keyword trigger list includes audio files for "Fire", "Police", "Help", "Lost Key", and "family's secret word is . . . ".

Referring now to FIG. 7, a flowchart of a method embodiment illustrates a plurality of processes performed by processors executing in parallel: at a server, waiting for a camera to open a connection 720; on the condition camera is connected, transmitting updated TIME_TO_REBOOT to camera 722; waiting PERIOD_B 744; determining whether camera remains connected 766; on condition camera has lost connection, returning to step 720; on condition camera remains connected, returning to step 722; wherein in embodiments, TIME_TO_REBOOT may be expressed as absolute Date-time, incremental date-time, day of week and time of day, units of time, calendar, number of connection failures; at a camera, initializing a plurality of parallel processes upon power cycle 710; a first parallel process comprising: opening a connection to a server 730; receiving and storing an updated TIME_TO_REBOOT from the server; 733; determining whether camera remains connected 735; on condition camera has lost connection, return to step 730; on condition camera remains connected, waiting PERIOD_A 737; and returning to step 733; and a second parallel process comprising: reading TIME_TO_REBOOT from non-transitory store 751; determining whether TIME_TO_REBOOT has been exceeded by CURRENT_STATE 753; on condition that CURRENT_STATE exceeds TIME_TO_REBOOT, returning to step 710; on condition that CURRENT_STATE does not exceed TIME_TO_REBOOT, waiting PERIOD_C 755; and returning to step 751.

Other embodiments of the invention include a system comprising a video doorbell (videoorbell); an intercommunication portal (IP); and a visitor filtration apparatus coupling said IP and said videoorbell, whereby a visitee operator may anticipate a visitor with certain date-time schedule and visitor indicia, store a greeting to be presented by the videoorbell upon matching said visitor indicia within said date-time schedule, and relay a message from videoorbell to intercommunication portal following a policy stored by the visitee operator.

In an embodiment, a policy stored by the visitee operator causes immediate real-time connection between IP and videoorbell when the visitor indicia is one of a face of close family members, and a face with uniform hat of emergency responders. In an embodiment, a policy stored by the visitee operator causes presentation of an outgoing greeting and storing an incoming message when the visitor indicia is one of face with uniform hat of delivery service, and face with uniform hat of government/utility representative.

In an embodiment, a visitor indicia is a shipment tracking document. In an embodiment, certain visitor indicia causes one of recording, transforming, storing, and forwarding a message to a visitee interview panel, and direct real-time connection to a legal services intermediary interview panel.

In an embodiment, said visitor filtration apparatus comprises a processor coupled to a policy store, a visitor indicia store, an outgoing greeting store, an incoming message store, and a connection circuit to couple to the videoorbell, the visitee interview panel, the legal services intermediary interview panel, the greeting store, and the message store.

Another aspect of the invention is a method to recover from intermittent failures without producing unnecessary gaps in the surveillance record. A camera is configured with a process to communicate with a server which regularly resets a rebooting process. The rebooting process completes when communication is interrupted beyond a limit. A plurality of processes performed by processors executing in parallel includes at a server, waiting for a camera to open a connection; when the camera is connected, transmitting updated TIME_TO_REBOOT to camera; waiting PERIOD_B; determining whether camera remains connected; when camera has lost connection, wait for reconnection and send another TIME_TO_REBOOT; when camera remains connected, repeat waiting; wherein in embodiments, TIME_TO_REBOOT may be expressed as absolute Date-time, incremental date-time, day of week and time of day, units of time, calendar, number of connection failures; at a camera, initializing a plurality of parallel processes upon power cycle; a first parallel process includes: opening a connection to a server; receiving and storing an updated TIME_TO_REBOOT from the server; determining whether camera remains connected; when camera has lost connection, attempt reconnection and getting updated TIME_TO_REBOOT; when camera remains connected, waiting PERIOD_A; and then checking for connection; and a second parallel process comprising: reading TIME_TO_REBOOT from non-transitory store; determining whether TIME_TO_REBOOT has been exceeded by CURRENT_STATE; when CURRENT_STATE exceeds TIME_TO_REBOOT, rebooting the processes; when CURRENT_STATE does not exceed TIME_TO_REBOOT, waiting PERIOD_C; and returning to checking for excessive non-communication.

CONCLUSION

The present invention can be easily distinguished from conventional IP cameras which have a fixed interval reboot cycle. The present invention can be easily distinguished from conventional IP cameras which are coupled to a Power over Ethernet switch requiring additional cost and management. Advantageously, in an exemplary embodiment, whenever our cloud cannot delay the reboot for 3× in a row it means the camera really lost cloud connection for 3 hours and reboots automatically. 99% of the time this solves the issue and cams comes back online. Result: less structural downtime, less churn, happier customer. BUT as long as camera stays reachable for the cloud or at least can be reached 1 of the 3× we try, we always delay the reboot and camera never reboots unnecessarily so is not causing unnecessary gaps in recordings. The disclosed embodiment is clearly distinguished over the planned maintenance reboot some manufacturers have in their cameras. And when you have no other way to reboot your camera (e.g. because you cannot reach it), this might be the only workable solution.

The present invention can be easily distinguished from simple voice mail or email system for presenting and receiving messages or video telephony. Stored policies enable time-shifting of physical or electronic access and limiting date-time ranges for each policy. Credentials may be cancelled unlike physical key lock boxes.

The present invention solves the long sought key exchange problem. A voicemail/cellphone cannot solve a key exchange problem. It avoids needing a physical key (vulnerable to duplication) to be exchanged. The invention creates temporary & conditional keys. The invention generates a new type of key that does not need physical exchange. Non-limiting examples include a physical optical key (printed QR-code) or digital image key (QR-code on mobile phone screen) which is temporary & conditional. The key can be invalidated remotely.

As is known, circuits disclosed above may be embodied by programmable logic, field programmable gate arrays, mask programmable gate arrays, standard cells, and computing devices limited by methods stored as instructions in non-transitory media.

Generally a computing devices 600 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A computing device may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on a computing device.

Figure 6:
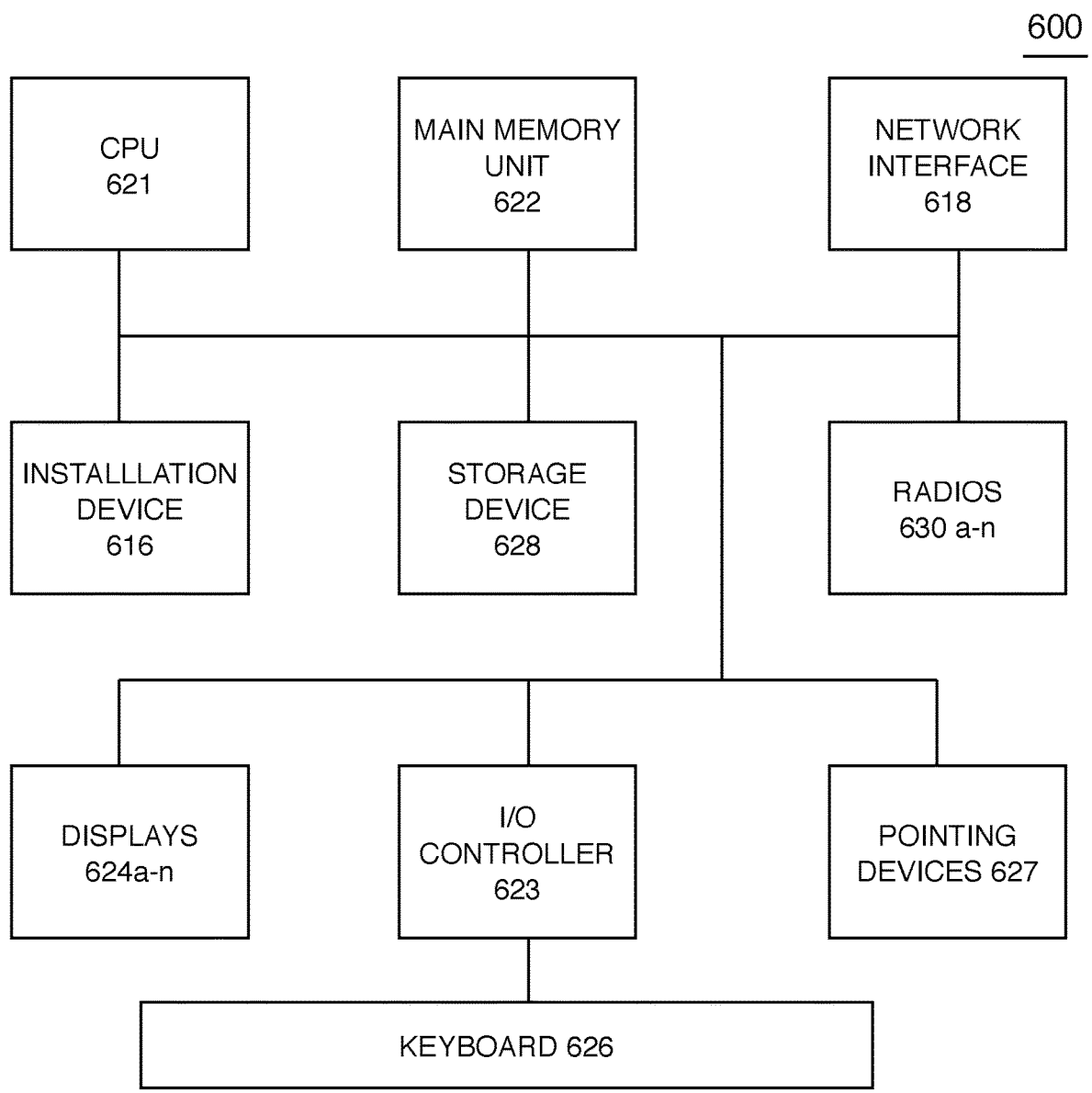
FIG. 6 is a block diagram of a processor suitable for performance of the method according to executable instructions stored in non-transient computer-readable media.

FIG. 6 depicts block diagrams of a computing device 600 useful for practicing an embodiment of the invention. As shown in FIG. 6, each computing device 600 includes a central processing unit 621, and a main memory unit 622. A computing device 600 may include a storage device 628, an installation device 616, a network interface 618, an I/O controller 623, display devices 624*a-n*, a keyboard 626, a pointing device 627, such as a mouse or touchscreen, and one or more other I/O devices 630*a-n* such as baseband processors, Bluetooth, GPS, and Wi-Fi radios. The storage device 628 may include, without limitation, an operating system and software.

The central processing unit 621 is any logic circuitry that responds to and processes instructions fetched from the main memory unit 622. In many embodiments, the central processing unit 621 is provided by a microprocessor unit, such as: those manufactured under license from ARM; those manufactured under license from Qualcomm; those manufactured by Intel Corporation of Santa Clara, Calif.; those manufactured by International Business Machines of Armonk, N.Y.; or those manufactured by Advanced Micro Devices of Sunnyvale, Calif. The computing device 600 may be based on any of these processors, or any other processor capable of operating as described herein.

Main memory unit 622 may be one or more memory chips capable of storing data and allowing any storage location to be directly accessed by the microprocessor 621. The main memory 622 may be based on any available memory chips capable of operating as described herein.

Furthermore, the computing device 600 may include a network interface 618 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. In one embodiment, the computing device 600 communicates with other computing devices 600 via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A computing device 600 of the sort depicted in FIG. 6 typically operates under the control of operating systems, which control scheduling of tasks and access to system resources.

In some embodiments, the computing device 600 may have different processors, operating systems, and input devices consistent with the device. In other embodiments, the computing device 600 is a mobile device, such as a JAVA-enabled cellular telephone or personal digital assistant (PDA).

In some embodiments, the computing device 600 comprises a combination of devices, such as a mobile phone combined with a digital audio player or portable media player.

As is known, circuits include gate arrays, programmable logic, and processors executing instructions stored in non-transitory media provide means for scheduling, cancelling, transmitting, editing, entering text and data, displaying and receiving selections among displayed indicia, and transforming stored files into displayable images and receiving from keyboards, touchpads, touchscreens, pointing devices, and keyboards, indications of acceptance, rejection, or selection.

It should be understood that the systems described above may provide multiple ones of any or each of those components and these components may be provided on either a standalone machine or, in some embodiments, on multiple machines in a distributed system. The phrases in one embodiment', in another embodiment', and the like, generally mean the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be PHP, PROLOG, PERL, C, C++, C #, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and nanostructured optical data stores. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Having described certain embodiments of methods and systems for video surveillance, it will now become apparent to one of skill in the art that other embodiments incorporating the concepts of the disclosure may be used. Therefore, the disclosure should not be limited to certain embodiments, but rather should be limited only by the spirit and scope of the following claims.

We claim:

1. A method of operation for a video doorbell comprising an IP camera (Videoorbell) apparatus comprising the processes:
   rebooting a processor at expiration of a first timer;
   opening a communication application programming interface at expiration of a second timer;
   upon successful connection to a server by the application programming interface, receiving and executing a command to reset at least one of first and second timer;
   capturing an audio-video stream;
   transforming date-time of capture and an optically encoded credential (OEC) within said audio-video stream into a hash;
   matching a stored transformation of an OEC with said hash; and
   performing an access policy according to the condition of one of success of said matching, and failure of said matching.

* * * * *